United States Patent [19]

Ersoy

[11] 4,279,462
[45] Jul. 21, 1981

[54] METHOD OF HOLOGRAPHIC PROCESSING OF WAVES

[75] Inventor: Okan K. Ersoy, Li, Norway

[73] Assignee: Sentralinstitutt for Industriell Forskning, Oslo, Norway

[21] Appl. No.: 19,187

[22] Filed: Mar. 9, 1979

[30] Foreign Application Priority Data

Mar. 9, 1978 [NO] Norway .................................. 780832

[51] Int. Cl.$^3$ ............................................. G03H 1/02
[52] U.S. Cl. ...................................... 350/3.6; 350/3.85
[58] Field of Search ..................... 350/3.60, 3.66, 3.67, 350/3.69, 3.70, 3.75, 3.85, 3.86, 162 SF

[56] References Cited

U.S. PATENT DOCUMENTS

| | | | |
|---|---|---|---|
| 3,580,655 | 5/1971 | Leith et al. | 350/3.6 X |
| 4,109,996 | 8/1978 | Ersoy | 350/3.66 |

*Primary Examiner*—John K. Corbin
*Assistant Examiner*—John D. Lee
*Attorney, Agent, or Firm*—Wenderoth, Lind & Ponack

[57] ABSTRACT

A new method for holographic processing of waves by means of an optical system is disclosed. The method is based on the generation of an unrecorded hologram, herein denoted virtual hologram, which satisfies optical requirements. The virtual hologram corresponds to the modulation of a reference wave, herein denoted virtual reference wave, with the object wave for a particular object, herein denoted real object. The virtual hologram exists in space in the form of an image of a recorded hologram, herein denoted real hologram, which satisfies technological requirements and which corresponds to the modulation of the transformed virtual reference wave, herein denoted real reference wave, with the transformed object wave which corresponds to a transformed object, herein denoted virtual object. Upon transformation of the real hologram by means of the optical system and a reconstruction wave, the virtual hologram is generated in space and the real object is reconstructed therefrom.

It is observed that neither the real hologram nor the virtual hologram are like regular holograms, in the sense that the virtual hologram, although somewhat similar to a regular hologram, is not registered in a physical medium, and the reconstruction with the real hologram without the optical system results in an image of transformed information which may be unrecognizable. It should be noted that the terms "virtual" and "real" are used here in another context than their usual meanings in optics.

17 Claims, 23 Drawing Figures

METHOD OF HOLOGRAPHIC PROCESSING OF WAVES

BACKGROUND AND SUMMARY OF THE INVENTION

The present invention concerns a method for holographic registration, processing and reconstruction of waves by means of an optical system. The invention can also be used for the reconstruction of information with one type of wave when the hologram registration is done with another type of wave.

Production of holograms by transformation of waves by means of optical systems is known previously in various connections, for example, fourier-transforming the object wave, imaging the object and the optical scaling of holograms. The present invention represents a new holographic process which is characterized in the generation of an unrecorded hologram, herein denoted virtual hologram, which satisfies optical requirements and which corresponds to the modulation of a reference wave, herein denoted virtual reference wave, with the object wave for a particular object, herein denoted real object, said virtual hologram being in the form of the image of a recorded hologram, herein denoted real hologram, which satisfies technological requirements, and which corresponds to the modulation of the transformed virtual reference wave, herein denoted real reference wave, with the transformed object wave, corresponding to a transformed object, herein denoted virtual object, and in the transformation of the real hologram by means of the optical system and a reconstruction wave, whereby the virtual hologram is generated and the real object is reconstructed therefrom. Hereafter this method will be denoted "Virtual Holography".

It should be noted that the terms "virtual" and "real" are used here in another context than their usual meanings in optics.

The said optical system is meant to include systems that transform other waves than light waves. In analog holography according to the invention, the optical system consists of lenses and other possible optical elements while the generation of a digital hologram requires the use of the corresponding formulas for the optical system, which are known from optics. During reconstruction according to the invention, a physical optical system is used in both cases, or reconstruction is simulated with a computer and a graphical display unit.

As known, analog holography, also called classical holography, and digital holography, also called computer-generated holography, have the basic principle in common that the interference pattern of an object wave and a reference wave is registered as a hologram, and, thereafter, the object wave is reconstructed by illuminating the hologram with a reconstruction wave, which can be the same as the previous reference wave. The present invention concerns both analog and digital holography.

As is known in digital holography, the registration of the hologram often involves difficulties, partially because the hologram points have a finite area. This invention makes it possible that the holographic process is adapted to the available technology, rather than the technology, as hitherto, is adapted to the holographic process in order to satisfy the requirements of the physical waves used.

BRIEF DESCRIPTION OF THE DRAWINGS

Since the virtual hologram is not to be registered in a physical medium, the invention involves a high degree of flexibility and a considerable number of advantages, which will be understood from the following description, including the drawings and photographs, wherein.

DETAILED DESCRIPTION OF THE INVENTION

Figure 1:
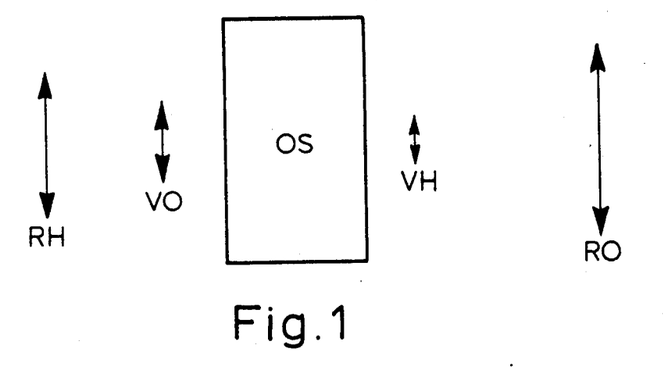
FIG. 1 illustrates the principle of the invention.

The arrangement in FIG. 1 shows an optical system OS and its relation to the objects and the holograms. The system OS may consist of different optical elements as lenses and mirrors that do not differ essentially from known systems, and which can be designed by people skilled in the art on the basis of the invention as explained with reference to FIG. 4. In correspondence with the definitions above, RO denotes a real object, VH a virtual hologram, VO a virtual object and RH a real hologram. Both the real object RO and the real hologram RH are transformed via the optical system to the virtual object VO, and the virtual hologram VH, such that RH/VO and VH/RO pairs are present. In other words, reconstruction with the real hologram RH without the optical system OS gives the virtual object VO whereas the reconstruction obtained from the virtual hologram VH gives the real object RO. It is the latter reconstruction that is of interest. Similarly, the reference wave for the virtual hologram, denoted virtual reference wave, and the reference wave for the real hologram, denoted real reference wave, are transforms of each other via the optical system. By using such combinations it becomes possible to adapt the system both to the technology and to the waves used.

Figure 2:
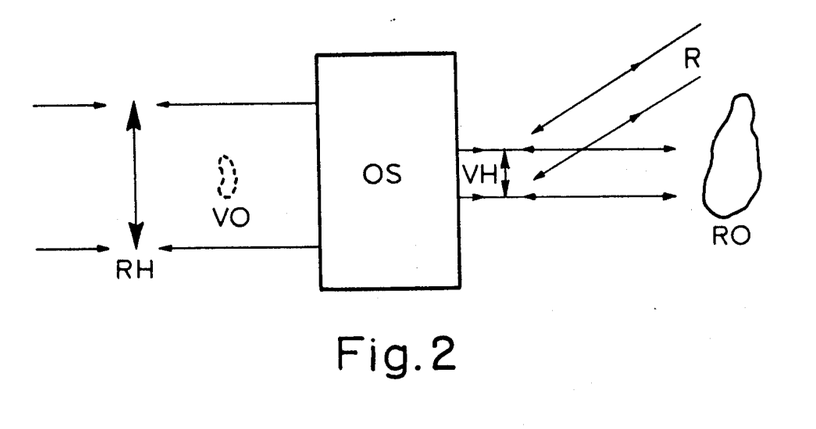
FIG. 2 shows one example of the invention.

In the example as shown in FIG. 2, the virtual hologram VH is taken as the start point. The size of the virtual hologram VH, its distance from the real object RO and the geometry of the virtual reference wave are chosen such that various requirements are satisfied. Then the optical system OS is designed so that one obtains the required real hologram with the necessary resolution, as the image of the virtual hologram. Since the virtual hologram is not physically recorded, one does not need to worry about overlapping hologram points in the virtual hologram due to the insufficient capacity of the recording device. In analog holography, the virtual hologram is formed by modulating the virtual reference wave R with the object wave coming from RO and the resulting interference pattern is imaged through the optical system to produce the real hologram RH. In digital holography the virtual hologram VH is calculated and coded, after which the transformation operation through the optical system is calculated in order to obtain the required data for the production of the real hologram RH.

Figure 3:
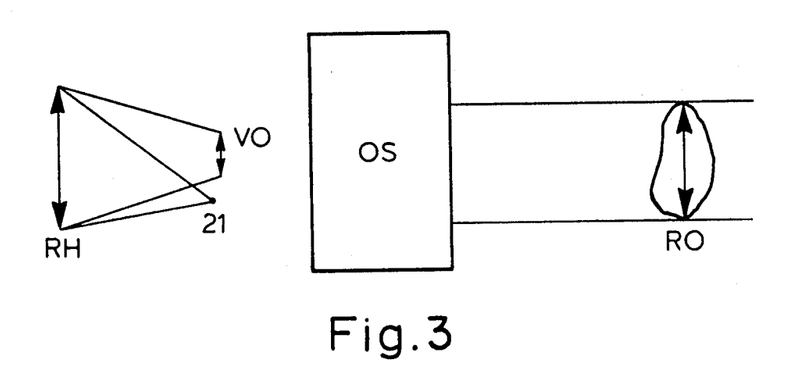
FIG. 3 shows another example.

In another example as shown in FIG. 3, the real object RO is transformed through the optical system to form the virtual object VO, and the source of a reference wave 21 is positioned in the neighbourhood of the virtual object VO such that the object wave can be separated from the reconstruction wave during reconstruction, if desired. In this embodiment the optical system OS is designed such that one obtains a real hologram RH with desired resolution, i.e. a desired number of interference fringes per mm, which depends on the size of the virtual object, the distance between the real hologram and the virtual object and the distance between the virtual object and the source of the real reference wave which can be a spherical wave, a plane wave, etc. In analog holography, the object beam coming from the object RO is transformed via the optical system into the virtual object VO; thereafter the real hologram RH is produced by modulating the real reference wave 21 with the wave coming from the virtual object VO. In digital holography the wave coming from the real object RO is transformed mathematically to the wave coming from the virtual object VO by using the formulas for the designed optical system OS, and thereafter the interference pattern is calculated and coded in the known fashion for the production of the real hologram RH.

Both examples as represented in FIGS. 2 and 3, are actually complimentary since one always has the RH/VO, VH/RO pairs in reconstruction, as indicated diagrammatically in FIG. 2 by the arrow direction to the left.

Figure 4:
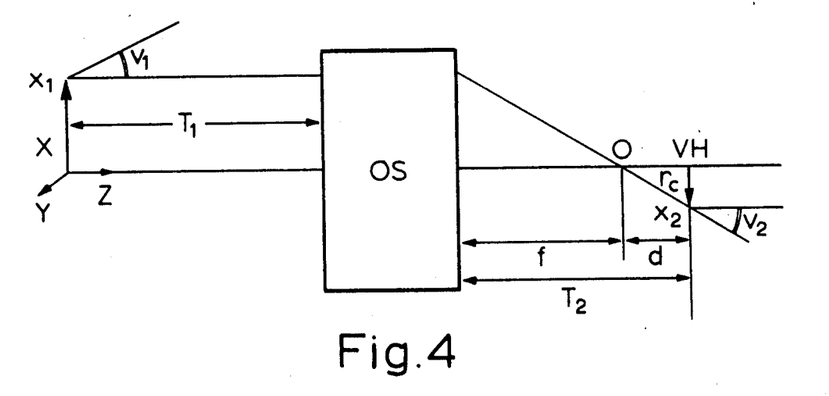
FIG. 4 is a drawing which shows parameters used in the design of an optical system.

The design of the optical system OS and generation of the real hologram RH is now to be explained further with reference to FIG. 4, where O is the focal point of the system at a distance from the optical system OS. $T_1$ and $T_2$ denote the distance between the real hologram RH and the optical system OS, and the distance between the optical system OS and the virtual hologram VH, respectively. The terms $x_1$ and $x_2$ denote the coordinates of the respective holograms in one dimension. The terms $v_1$ and $v_2$ denote the angles which a beam at the corresponding hologram points makes with the main axis z. The radius vector length $r_c$ between the focal point O and the virtual hologram point $x_2$ determines that part of the virtual reference wave which is due to the optical system OS.

Transformation through the optical system between the real hologram RH and the virtual hologram VH can be expressed by the equation:

$$\begin{bmatrix} x_2 \\ v_2 \end{bmatrix} = [S'] \begin{bmatrix} x_1 \\ v_1 \end{bmatrix}$$

where [S'] is given by $$[S'] = \begin{bmatrix} A' & B' \\ C' & D' \end{bmatrix}$$

with
$A' = A + CT_2$
$B' = (A + CT_2)T_1 + B + DT_2$
$C' = C$
$D' = CT_1 + D$ where $$S = \begin{bmatrix} A & B \\ C & D \end{bmatrix}$$

is the transfer matrix of the optical system. In order to obtain image transformation B' must equal 0 such that $$T_2 = -(AT_1 + B)M$$

where M is the magnification.

$$M \equiv (x_2/x_1) = A' = 1/D'$$

A plane wave, input to the optical system OS at an angle $v_p$ focuses to a point at a distance $$f = -A/C$$

with coordinate $$x_2 = (B + Df)v_p.$$

Using these equations, one can easily calculate $r_c$.

The radius vector length $r_c$ determines that part of the reference wave on the virtual hologram which is due to the optical system. In case the optical system consists of a series of sets of optical elements, each set will form its own virtual hologram and reference wave. The other part of the reference wave is due to the reconstruction wave on the real hologram. All the reference waves and up on the last virtual hologram to make up the effective virtual reference wave.

Three examples will be considered. The first one is a single lens. In this case, one obtains
$A = 1$
$B = 0$
$C = -1/f$
$D = 1$
so that $$(1/T_1) + (1/T_2) = (1/f)$$

$$M = -(T_2/T_1)$$

The second example is the telescopic system. Here $f = \infty$, so that the virtual reference wave is planar. If two lenses with focal lengths $f_1$ and $f_2$ are used, one obtains $A' = -F^{-1} \equiv -f_1/f_2$ $B' = f_1 + f_2$ $C' = 0$ $D' = -F$ so that $$M = -F^{-1}$$

$$T_2 = (f_1 + f_2)/F - (T_1/F^2)$$

It is seen that M is independent of real hologram coordinates, and if F is large, $T_2$ is very insensitive to $T_1$.

The third example is the lensless fourier arrangement, which is obtained when the point O lies on the image plane. If $z_o$ is the distance from the virtual hologram to the image plane, one obtains $$A/C = -(T_2 + z_o)$$

Spreading of waves from the holograms can be explained by means of the angles $v_1$ and $v_2$. From the transfer equation it is found that $$v_2 = C'x_1 + D'v_1.$$

Since image transformation is of interest, then $$C' = -(1/f)$$

$$D' = (1/M).$$

Accordingly, the angle spreading is increased when f and M are reduced.

Reconstruction of the object wave can by example be explained in a similar way as in co-pending U.S. patent application No. 19,188, filed Mar. 9, 1979. Assuming that the different components of the reference wave result in a total effective reference wave which is a spherical wave with a source at the point $(x_c, y_c, z_c)$, one can show that the object wave emanating from the real hologram, when reconstructed with a spherical reconstruction wave with a source at the point $(x_c', y_c', z_c')$, results in an image with point coordinates $(x_o', y_o', z_o')$, given by:

$$\frac{1}{z_o'} = \frac{1}{M^2}\left(\frac{1}{z_o} + \frac{1}{z_c}\right) - \frac{1}{z_c'}$$

$$x_o' = z_o'\left(M\left(\frac{x_o}{z_o} + \frac{x_c}{z_c}\right) - \frac{x_c'}{z_c'}\right)$$

$$y_o' = z_o'\left(M\left(\frac{y_o}{z_o} + \frac{y_c}{z_c}\right) - \frac{y_c'}{z_c'}\right)$$

where $(x_o, y_o, z_o)$ are the coordinates of the corresponding real object point.

These equations show that there exists an image of the real object in three dimensions, named the virtual object.

In a simple realization of the invention, some digital holograms were generated, using the method described in U.S. Pat. No. 4,109,996 and by means of a spherical reference wave as described in the contemporary above mentioned patent application. On this basis the position of each virtual hologram point was chosen according to the formula $$\phi_i(x_i, y_i) + kr_{oi} = 2\pi n + \phi_o$$

wherein $\phi_i$ is the phase of the reference wave at the position $(x_i, y_i, 0)$ for the virtual hologram point, n is an integer, $\phi_o$ is the phase at the object point with position coordinates $(x_o, y_o, z_o)$, and $$r_{oi} = \pm\sqrt{(x_o - x_i)^2 + (y_o - y_i)^2 + z_o^2}$$

where the sign +, or −, is used if the reconstructed object is to be real, or virtual.
The phase
$\phi_i$ is given by
$\phi_i = kr_{ci}$ where $$r_{ci} = \sqrt{(x_c - x_i)^2 + (y_c - y_i)^2 + z_c^2}$$

and where $(x_c, y_c, z_c)$ is determined by the optical system. If for instance, the focal point lies on the axis of the optical system having a single lens, these coordinates can be chosen to be:
$x_c = 0$
$y_c = 0$
$z_c = -fM$
The corresponding coordinates on the real hologram are $(x_i/M, y_i/M)$.

Using this method some digital real holograms of various synthetic objects were produced as mentioned above, and reconstructions were achieved by means of the optical system shown in FIG. 4. Some of the reconstructions are described below. The above analysis can also be considered as impulse response (one object point) analysis in the case of analog holography. Thus, the results are equally valid in both types of holography.

Since the virtual object VO can be chosen to be quite small, the optical system OS can be designed to pass through only the wave coming from the virtual object VO, and filter out the other waves during reconstruction. In this way the signal to noise ratio can be increased. This approach is in particular suitable in connection with data compression and bandwidth reduction in information transmission and processing.

Figure 5:
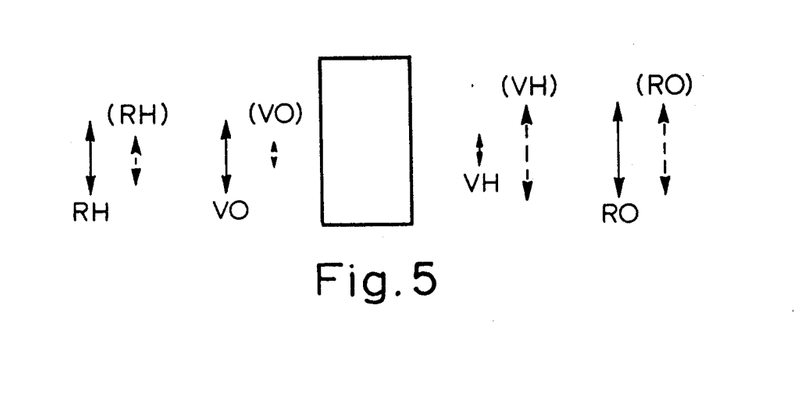
FIG. 5 shows different mutual relationships between objects and holograms.

FIG. 5 shows the various combinations possible with the described objects and holograms. When the sizes of the real hologram and the virtual object or the sizes of the virtual hologram and the real object are chosen the same, convolution is involved in the diffractive process of construction and reconstruction.

Figure 6:
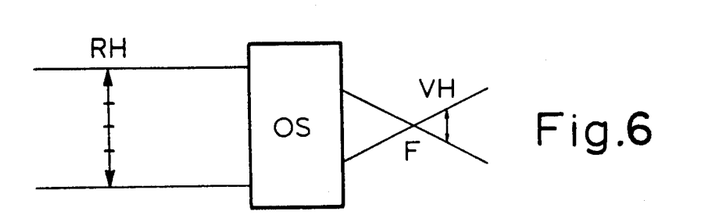
FIGS. 6, 6a and 6b illustrate an example for the production of a hologram set.
Figure 6A:
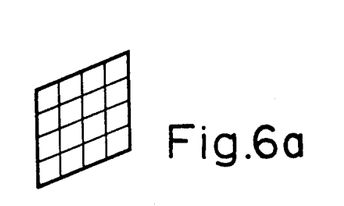
Figure 6B:
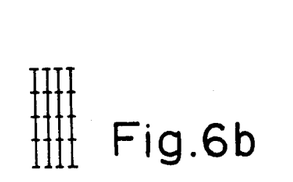

FIG. 6 shows the production of a hologram set. Here the real hologram RH is shown as a real hologram set comprising 16 single holograms as indicated in FIG. 6a, or as a volume hologram set where the single holograms have been arranged in a particular way in a volume, for instance, as shown in FIG. 6b. Generation of a corresponding number of virtual single holograms in the form of a virtual hologram set VH, as well as transformation of these to the real hologram set, are as explained above in connection with FIG. 4.

Because each real single hologram is a window by itself, the object wave coming from each of these is directed in its own direction. Thus, one large hologram set does not necessarily result in simultaneous and increased information density to the eye or other detection device which has a limited effective aperture smaller in size than the hologram set. This means that only a portion of the total information in the hologram set is visible to the eye or the detection device. However, when such a real hologram set is transformed to a virtual hologram set in reduced scale such that the effective aperture of the eye or the detection device is the same or larger than the virtual hologram set, the total information becomes visible simultaneously through the window of the virtual hologram set.

Because virtual holography makes it possible to adapt the holographic process to the desired technology for recording holograms, it becomes easier than before to produce analog and digital volume holograms when the real hologram is recorded in a relatively large volume and the virtual volume hologram occupies a smaller volume. Related to volume holography, there is the possibility of arranging single real holograms in a volume and control interference between the object waves coming from the corresponding virtual holograms with coarse adjustments in the real space since such adjustments correspond to much finer adjustments in the virtual space when the virtual holograms are smaller than the real holograms. Such effects can be used in interferometry or optical filtering where the wave from a virtual hologram can be used as a filter for the wave from another virtual hologram. Adjustments and control can be performed quite simply by moving the real holograms in relation to each other.

Figure 7:
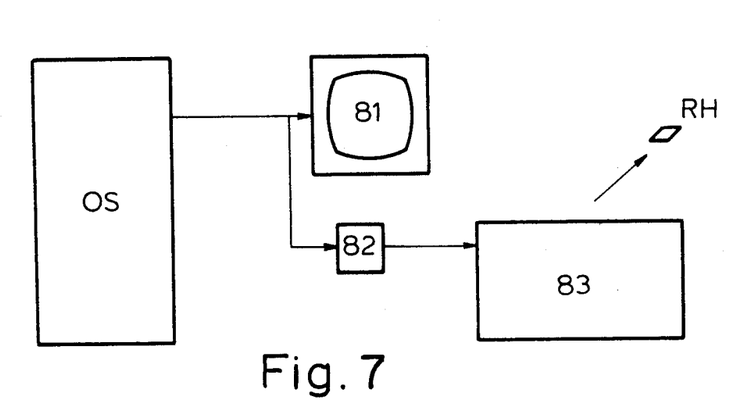
FIG. 7 shows production of holograms by means of equipment for graphic display and copying.

The optical system in virtual holography can be quite easily adapted to an electro-optic system for the purpose of information processing. Because the real hologram can be made rather coarse, its registration can be performed rapidly, and may as well be recorded in an interactive way with systems working in real time. One such system is shown in FIG. 7 where the optical system including a data machine is connected to a graphical equipment for registration of the real hologram on a graphical screen or similar device 81 or directly on paper with a plotter 82, followed by copying on a transparency with a copying machine 83, if desired. Actual experiments corresponding to this description have been performed, and some examples of digital holograms and reconstructions obtained therefrom are described below.

Figure 8:
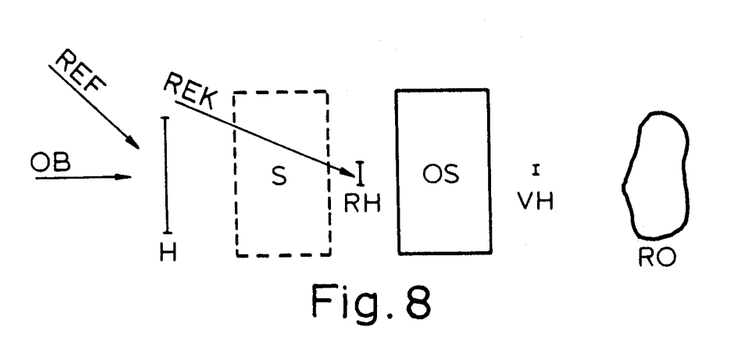
FIG. 8 is an arrangement for reconstruction with one wavelength by means of a hologram recorded with another wavelength.

In FIG. 8, H denotes a hologram that is recorded with the object wave OB and the reference wave REF, having a wavelength $\lambda_1$. Reconstruction of the object RO, which can be the scaled version of the object with which H is recorded, is to be performed with a reconstruction wave REK having a wavelength $\lambda_2$. Ideally the hologram H has to be scaled down in the ratio $\lambda_2/\lambda_1$ in order to avoid image distortion. In virtual holography, such distortions can be reduced by introducing the virtual hologram VH and if desirable, transform the hologram H into a real hologram RH with a scaling system S so that RH can be further processed with OS. Such a procedure is necessary when H is incompatible with OS. The design of the optical system OS is done as before based on RH, VH, and resolution requirements of the image of RO. When H can be made compatible with OS, H can be directly used as RH. Such a system makes it possible to operate in real time. The reconstruction obtained from an acoustic hologram with laser light is described below.

In the following, some experiments will be described, where reconstructions were obtained partly from digital holograms which were produced according to the invention, and partly from other holograms, with the optical arrangement according to the invention.

Figure 9:
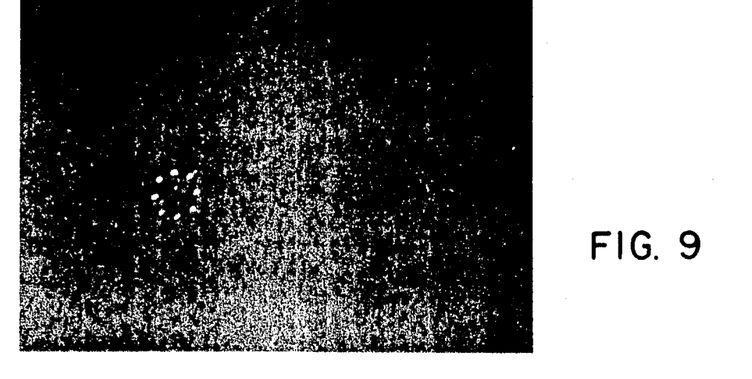
FIGS. 9-11 are photographs of reconstructions where hologram production and reconstruction were performed with waves of the same wavelength.

In FIG. 9 the object is a circle slanted in the z-direction. This is why the reconstruction seems slightly elliptic, indicating the three-dimensional nature of the object points. The real hologram was produced by using a spherical reference wave as described above, and is 2×2 mm in size. This hologram was reduced 4 times with a lens with f=20 mm to give the virtual hologram. The distance d in FIG. 4 was chosen to be 5 mm.

Figure 10:
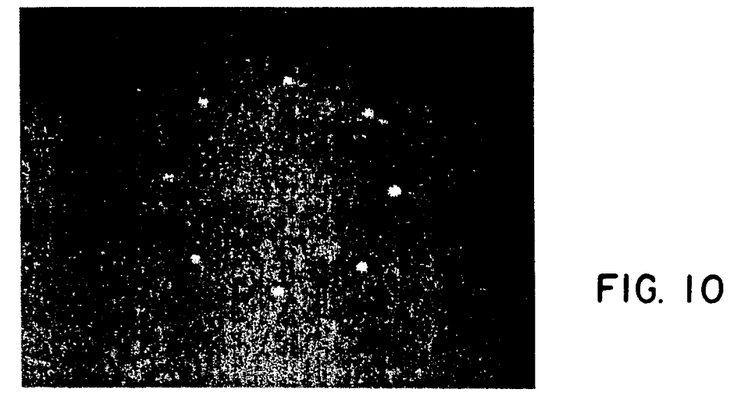

It appeared that the virtual hologram has the same properties regarding magnification and focusing as the one-image holograms described in the above mentioned contemporary U.S. patent application, since the virtual reference wave is a spherical wave with point source close to the virtual hologram. This observation has been shown in FIG. 10 where the image was focused in another position than in FIG. 9, and farther from the virtual hologram such that is became enlarged.

Figure 11:
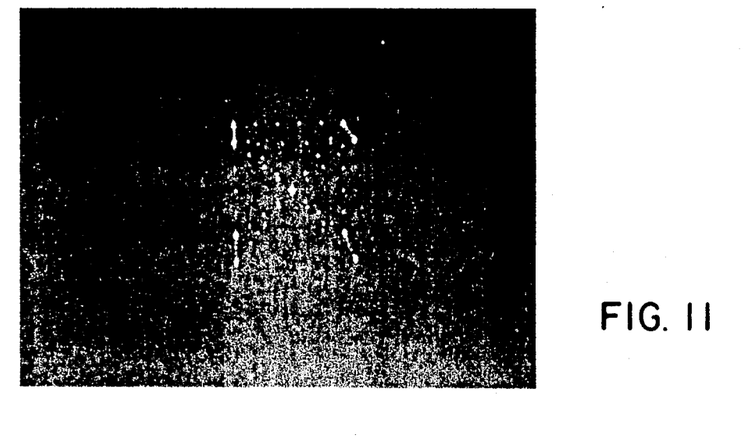

As described above, 16 adjacent single-holograms were produced for a real hologram set. One of the diagonals, all the corner points and the mid-point of a cube were generated with each single-hologram. FIG. 11 shows the reconstruction obtained when the real hologram set was illuminated as a whole with the reconstruction wave. Because all the holograms contribute to all the corner points and the mid-point, these image points appear more intense than the other image points. When one looks through the position of the virtual hologram, one sees the whole cube in space. The experiments that are described in the following were achieved with an optical system OS which comprised a microscope objective with a focal length of 2 mm and a camera objective with a focal length of 18 cm and a diameter of 6 cm. These optical elements were arranged telescopically such that the distance between them was approximately equal to the sum of the focal lengths. The microscope objective was adjustable in the z-direction for adjustment of the virtual reference wave. The reconstruction wave was obtained from a He-Ne-laser beam passed through a collimator in order to obtain a plane wave illuminating the real hologram.

Figure 12:
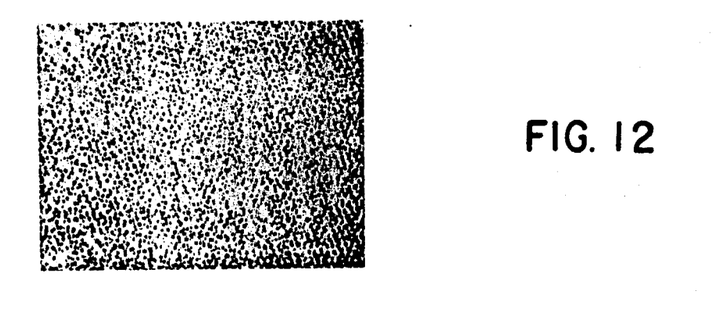
FIGS. 12-15 are photographs of coarse holograms and of reconstructions obtained therefrom.
Figure 13:
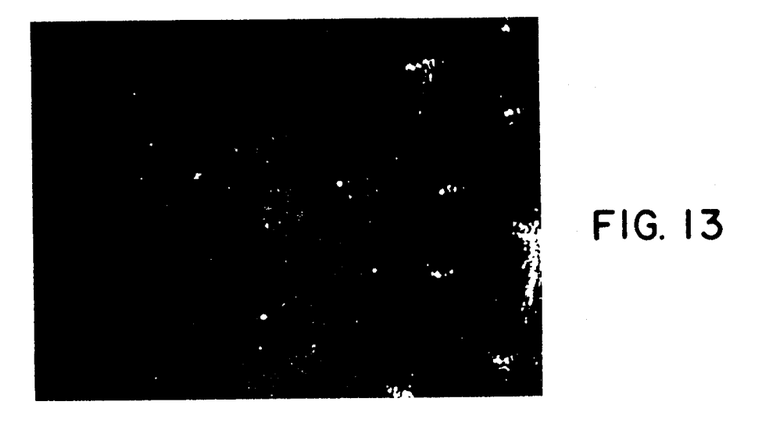

FIG. 12 shows a real hologram of four object points in a star configuration, produced by calculating the digital virtual hologram as explained with reference to FIG. 4, and transforming it to the real hologram as explained with reference to FIG. 7. The hologram shown in FIG. 12 is of actual size. The reconstruction is shown in FIG. 13. The star configuration can be seen slightly to the left of the middle of the picture. The other points are of higher orders.

Figure 14:
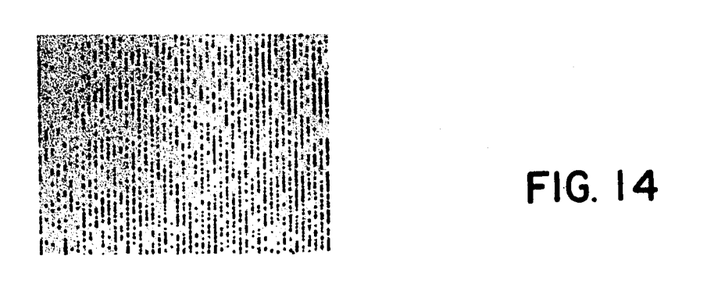
Figure 15:
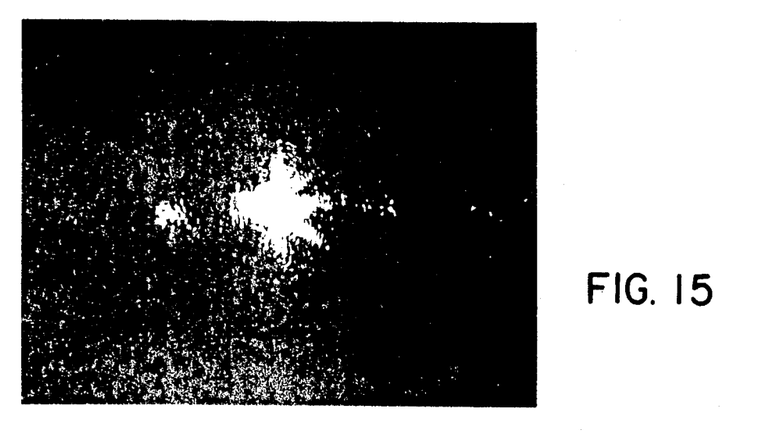

FIG. 14 shows a one-object point hologram of actual size in the lensless fourier arrangement. This hologram was duplicated several times in order to study volume effects. FIG. 15 shows the reconstruction obtained when 3 holograms were spaced at approximately 60 cm from each other. It is seen that there is a single dominant first harmonic while the other harmonics were basically filtered out. Adjustment of holograms with respect to each other was very easy because the real hologram is reduced close to 100 times in the vertical direction and 10,000 times in the horizontal direction by the optical system in order to generate the virtual hologram. This means that 60 cm in the real hologram space is reduced to 60 microns in the virtual hologram space.

These volume effects can be considered in two ways: the first one is that the three holograms constitute a volume hologram in the virtual hologram space. The other approach is to think of one hologram as filtering the output from another.

Figure 16:
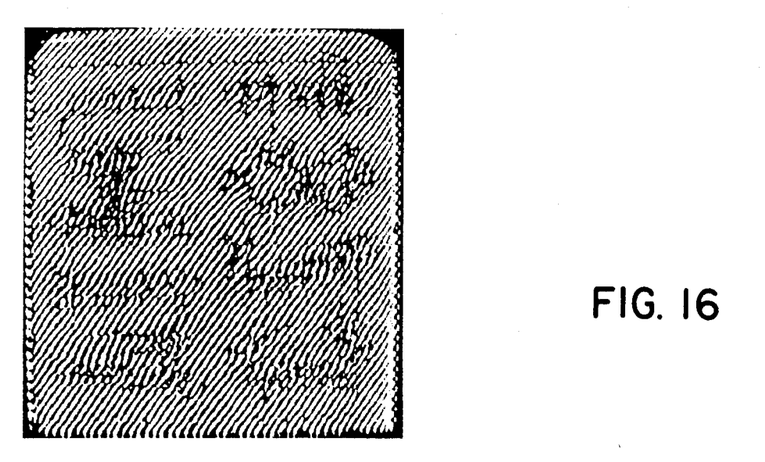
FIGS. 16-17 are photographs of an acoustic hologram and reconstruction obtained from it with laser light.
Figure 17:
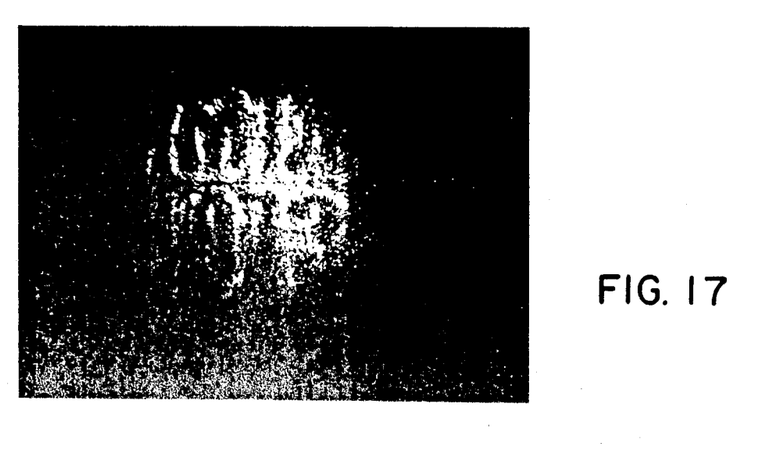

FIG. 16 shows an acoustic hologram detected by a matrix of 200×200 electrostatic transducers. The hologram, which is recorded with ultrasound, is copied from N. H. Farhat: Advances in Holography, vol. 1, page 88, published by Marcel Dekker, 1975. FIG. 17 shows the reconstruction obtained with the optical system described above. Because the numeral aperture of the optical system was not large enough, the edges of the signal were partially filtered out.

Figure 18:
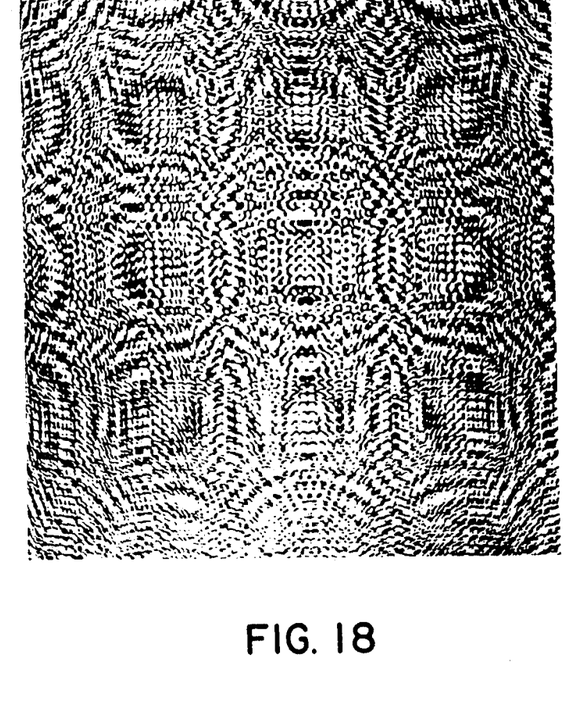
FIGS. 18-21 are photographs of holograms chosen from the literature and of reconstructions obtained therefrom.
Figure 19:
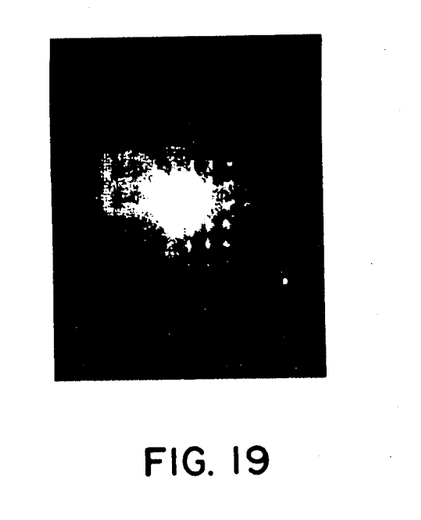

FIG. 18 shows the enlarged picture of a kinoform-type hologram, copied from the book called Optical Holography by R. J. Collier, C. B. Burckhardt, L. H. Lin, page 561, Academic Press 1971. FIG. 19 shows the reconstruction obtained from it with the optical system. Normally a kinoform generates a single image is phase-matching is properly done. Since the transparent copy was basically binary, two images were obtained. The dots that are seen happen to be the fourier transform of the other image. By adjusting the virtual reference wave, it was possible to focus the other image on the same plane. Then the first image was fourier-transformed.

Figure 20:
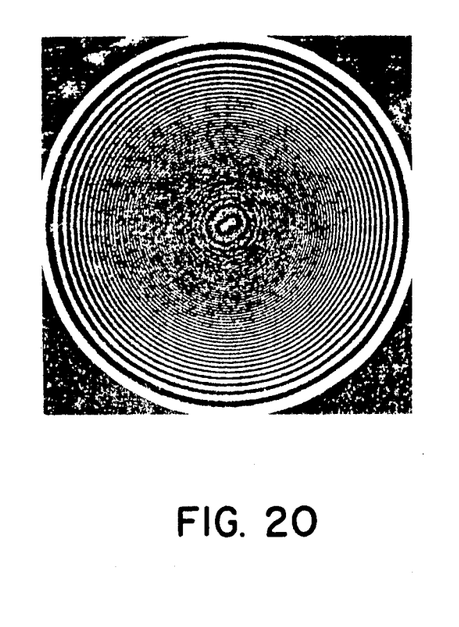
Figure 21:
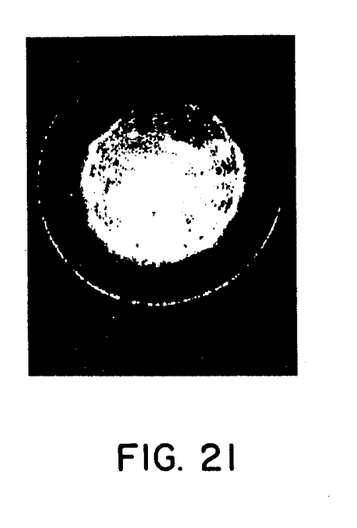

FIG. 20 is the enlarged photograph of the diffraction pattern of a 1.25 cm diameter aperture located 1 m from a point source and 1 m from the receiving screen, copied from the article by L. P. Boivin, Applied Optics, vol. 14, page 2002, 1975. This diffraction pattern was used as the analog real hologram and reconstruction obtained from it with the optical system is shown in FIG. 21. The outer ring represents the reconstructed aperture and the inner circular light area shows the spherical reference wave used.

I claim:

1. A method for holographic processing of waves wherein an object wave is transformed by means of an optical system, characterized in the generation of an unrecorded hologram, herein denoted virtual hologram, which satisfies optical requirements and which corresponds to the modulation of a reference wave, herein denoted virtual reference wave, with the object wave for a particular object, herein denoted real object, said virtual hologram being in the form of the image of a recorded hologram, herein denoted real hologram, which satisfies technological requirements, and which corresponds to the modulation of the transformed virtual reference wave, herein denoted real reference wave, with the transformed object wave, corresponding to the transformed particular object, herein denoted virtual object, and in the transformation of the real hologram by means of the optical system and a reconstruction wave, whereby the virtual hologram is generated and the real object is reconstructed therefrom.

2. A method as claimed in claim 1, characterized in that the production of the real hologram comprises preparatory generation of the virtual hologram by modulating the virtual reference wave with the real object wave and subsequent transformation of the virtual hologram to the real hologram, whereby the virtual object is generated as well, and that the reconstruction wave is directed through the thus produced real hologram and through the optical system, thus regenerating the virtual hologram and reconstructing the real object therefrom.

3. A method as claimed in claim 2, characterized in that the virtual hologram is generated in geometrical extensions that are different from those of the real hologram.

4. A method as claimed in claim 3, characterized in that the virtual hologram is made substantially smaller than the real hologram.

5. A method as claimed in claim 1, characterized in that the production of the real hologram comprises preparatory transformation of the object wave by transforming the real object to the virtual object and subsequent generation of the real hologram by modulating a real reference wave, which corresponds to the transformed virtual reference wave, with the virtual object wave, whereby the virtual hologram is also provided for indirectly, and that the reconstruction wave is directed through the thus produced real hologram and through the optical system, thus regenerating the virtual hologram and reconstructing the real object therefrom.

6. A method as claimed in claim 5, characterized in that the real object is transformed to a virtual object of different geometrical extensions.

7. A method as claimed in claim 6, characterized in that the real object is transformed to a substantially smaller virtual object, in which case the optical system can be arranged to transmit only the virtual object wave during reconstruction and to filter out undesired waves in the form of noise.

8. A method as claimed in claim 2 or 5, characterized in that a number of virtual holograms and corresponding real holograms are generated in the form of virtual and real hologram sets.

9. A method as claimed in claim 8, characterized in that the virtual holograms are given mutually dependent information for the production of the corresponding real holograms, which can be used in interferometry and optical data processing.

10. A method as claimed in claim 2 or 5, characterized in that the virtual reference wave is a spherical wave with its point source close to the virtual hologram and that the distance between the said point source and the virtual hologram is adjusted during the construction and the reconstruction processes in order to control the reconstructed waves.

11. A method as claimed in claim 2 or 5, characterized in that the real reference wave is a spherical wave with its point source close to the virtual object and that the distance between the said point source and the virtual object is adjusted during the construction process in order to control the real hologram parameters.

12. A method as claimed in claim 1, including generation of an ordinary hologram of a particular object, characterized in that the ordinary hologram is processed optically and/or electronically to generate the real hologram of the virtual object, and that the reconstruction wave is directed through the thus produced real hologram and through the optical system, thus generating the virtual hologram, which corresponds to the ordinary hologram, and reconstructing therefrom the real object, which may be a sealed version of the particular object, said system being adjusted during the reconstruction process until the required virtual reference wave, virtual hologram and the reconstruction of the real object are obtained.

13. A method as claimed in claim 12, characterized in that the ordinary hologram for a particular object is recorded with waves having a wave length which is different from the wavelength of the reconstruction wave.

14. A method as claimed in claim 1, characterized in that the virtual hologram is generated with a plurality of virtual reference waves modulated by the real object wave.

15. A method as claimed in claim 1, characterized in that convolution is involved when the virtual hologram is generated in geometrical extensions equal to those of the real object, or when the real hologram is generated in geometrical extensions equal to those of the virtual object.

16. A method as claimed in claim 1, characterized in that a virtual volume hologram corresponding to a real volume hologram is generated.

17. A method as claimed in claim 1, characterized in that data compression and band width reduction are achieved with the generation of the real and virtual holograms.

* * * * *